United States Patent [19]
Nishizawa et al.

[11] Patent Number: 6,125,974
[45] Date of Patent: Oct. 3, 2000

[54] VIBRATION DAMPER FOR VEHICLE BRAKES

[75] Inventors: Yukio Nishizawa; Shiro Nakajima, both of Itami, Japan

[73] Assignee: Sumitomo Electric Industries, Ltd., Osaka, Japan

[21] Appl. No.: 09/070,010

[22] Filed: Apr. 30, 1998

[30] Foreign Application Priority Data

May 12, 1997 [JP] Japan ................................ 9-120995

[51] Int. Cl.⁷ .................................................. F16D 65/38
[52] U.S. Cl. ........................ 188/73.35; 188/73.37; 303/20
[58] Field of Search .................................. 188/378, 379, 188/380, 266.7, 73.37, 73.35, 73.36; 303/20

[56] References Cited

U.S. PATENT DOCUMENTS 5,175,687  12/1992  Tsutsumi et al. ................ 364/427.05

FOREIGN PATENT DOCUMENTS

| 0748947 | 12/1996 | European Pat. Off. . |
| 4-54324 | 2/1992 | Japan . |
| 4-54325 | 2/1992 | Japan . |
| 6245552 | 9/1994 | Japan . |
| 7111788 | 4/1995 | Japan . |

OTHER PUBLICATIONS

Yukio Nishizawa et al., "Electronic Control Canceling System for a Disc Brake Noise", Proceedings of the 1997 International Congress and Exposition; Detroit, MI., Feb. 27, 1997, vol. 1229, Feb., 1997, pp. 83–88, XP002075840.
Patent Abstracts of Japan, vol. 018, No. 641.
Patent Abstracts of Japan, vol. 095, No. 007.

*Primary Examiner*—Matthew C. Graham
*Attorney, Agent, or Firm*—Greenblum & Bernstein, P.L.C.

[57] ABSTRACT

A vibration damper system which can restore the performance of piezoelectric elements that have deteriorated in performance due to temperature buildup resulting from repeated braking operations by applying high voltage at a predetermined time. In the vibration damper system for a vehicle brake including a vibration detector for detecting vibration by pads and a disk rotor and adapted to transmit a vibration damping signal to a vibrator through a control circuit to suppress vibration, when a performance deterioration restoration timing signal is inputted from the ignition switch, the control circuit produces a performance restoration command signal to changeover switches, thus applying high voltage from a high voltage source for a predetermined time (about one second) to restore deteriorated piezoelectric properties.

4 Claims, 3 Drawing Sheets

VIBRATION DAMPER FOR VEHICLE BRAKES

BACKGROUND OF THE INVENTION

This invention relates to a vibration damper for vehicle brakes which can prevent squeals of a vehicle wheel brake produced during braking.

A wheel brake tends to squeal during braking. Various means have been proposed to prevent such brake squeals. As conventional such squeal-preventive means, brake vibration dampers disclosed in unexamined Japanese patent publications 4-54324 and 4-54325 are known.

The former publication discloses a vibration damper having a piezoelectric vibrator for applying inaudible vibration to friction members (pads), and another vibration damper comprising a piezoelectric detector for detecting vibration of the friction members, and a piezoelectric vibrator for applying inaudible vibration to the pads only while the detector is detecting vibration of the pads.

The latter publication discloses a vibration damper including a piezoelectric vibration detector for detecting vibration of the friction members, and a vibrator means for vibrating the friction members to dampen their vibration according to the detected vibration. In one embodiment, the vibrator applies vibration 180° out of phase from the vibration detected. In another embodiment, both the above two piezoelectric elements are used.

The vibration damper systems disclosed in the above two publications apply inaudible vibrations through piezoelectric elements, or vibrate friction members through piezoelectric elements according to the vibration detected to dampen vibration. These systems have various problems.

For example, in the case of a disk brake, in which braking force is applied to the disk by pressing pads as friction members against the disk, if braking force is applied suddenly, continuously or repeatedly for a long time, the pads are heated to high temperatures due to friction heat. Thus, the piezoelectric element, too, provided in the caliper near the pads are heated.

Piezoelectric elements are polarized to produce electric characteristics when pressure is applied to a crystal of e.g. piezoelectric element $ZnO_2$, and produce piezoelectricity when the above process is reversed. It is preferable to use piezoelectric vibration detector and vibrator having as large a piezoelectric effect (piezoelectric constant) as possible.

But the greater the piezoelectric constant of a piezoelectric element, the lower its Curie temperature and the more it is likely to deteriorate at high temperature. Curie temperature is a critical temperature at which a piezoelectric element loses its spontaneous polarization properties and thus its piezoelectricity. Once a piezoelectric element loses its piezoelectricity, it cannot restore its original properties simply by cooling down to normal temperatures.

The temperature around piezoelectric elements mounted in a brake caliper can rise to 200° C. or higher. If the ambient temperature approaches or exceeds the Curie temperature of the piezoelectric elements, their performance deteriorates quickly. But it is known that piezoelectric elements that have deteriorated in performance and thus have collapsed orientation of polarization can restore polarization orientation by applying a DC high field.

But in spite of this fact, none of the above two publications and any other publication discloses or suggests any solution to the problem of deterioration of piezoelectric elements in brake vibration damper systems.

An object of this invention is to provide a vibration damper system which can restore the performance of piezoelectric elements that have deteriorated in performance due to temperature buildup resulting from repeated braking actions.

SUMMARY OF THE INVENTION

According to this invention, there is provided a vibration damper system for a vehicle brake including a vibration detector means comprising piezoelectric elements for detecting vibration produced when a rotary member of the wheel brake is braked by a friction member, a control circuit and a vibrator means comprising piezoelectric element, the vibration detector means transmitting a vibration damping signal to the vibrator means through the control circuit to suppress vibration, the vibration damper system further comprising a high source and changeover means provided along a signal line connecting each of the piezoelectric elements of the vibration detector means and the vibrator means to the control circuit, the control circuit transmitting a changeover signal to one or some of the changeover means in response to a timing signal inputted into the control circuit to apply high voltage to one or some of the piezoelectric elements from the high voltage source.

According to the wheel brake vibration damper system of this invention, even if the performance of the piezoelectric elements deteriorates due to high temperatures, restoration of such performance is possible, and intended vibration damping function is expectable. Performance deterioration of piezoelectric elements is mostly due to high temperatures. But even for deterioration due to collapse of polarization orientation for other causes, piezoelectric elements can restore polarization properties and recover piezoelectricity by applying high voltage.

As long as the piezoelectric elements are normal, the vibration damper system applies vibration corresponding to the vibration detected by the vibration detector through the vibrator to cancel and suppress vibration. But if the piezoelectric elements are subjected to high temperature due to repeated braking, they will lose their piezoelectric properties.

The vibration damper system according to this invention is provided with a changeover means in signal lines connecting each piezoelectric element to the control circuit. When the changeover means is changed over by a changeover signal from the control circuit, a predetermined high voltage is applied to the piezoelectric elements for a predetermined time. The high voltage makes it possible for the piezoelectric elements to restore piezoelectricity and recover the original vibration damping function.

Other features and objects of the present invention will become apparent from the following description made with reference to the accompanying drawings, in which:

DETAILED DESCRIPTION OF THE PREFERRED EMBODIMENT

Figure 1:
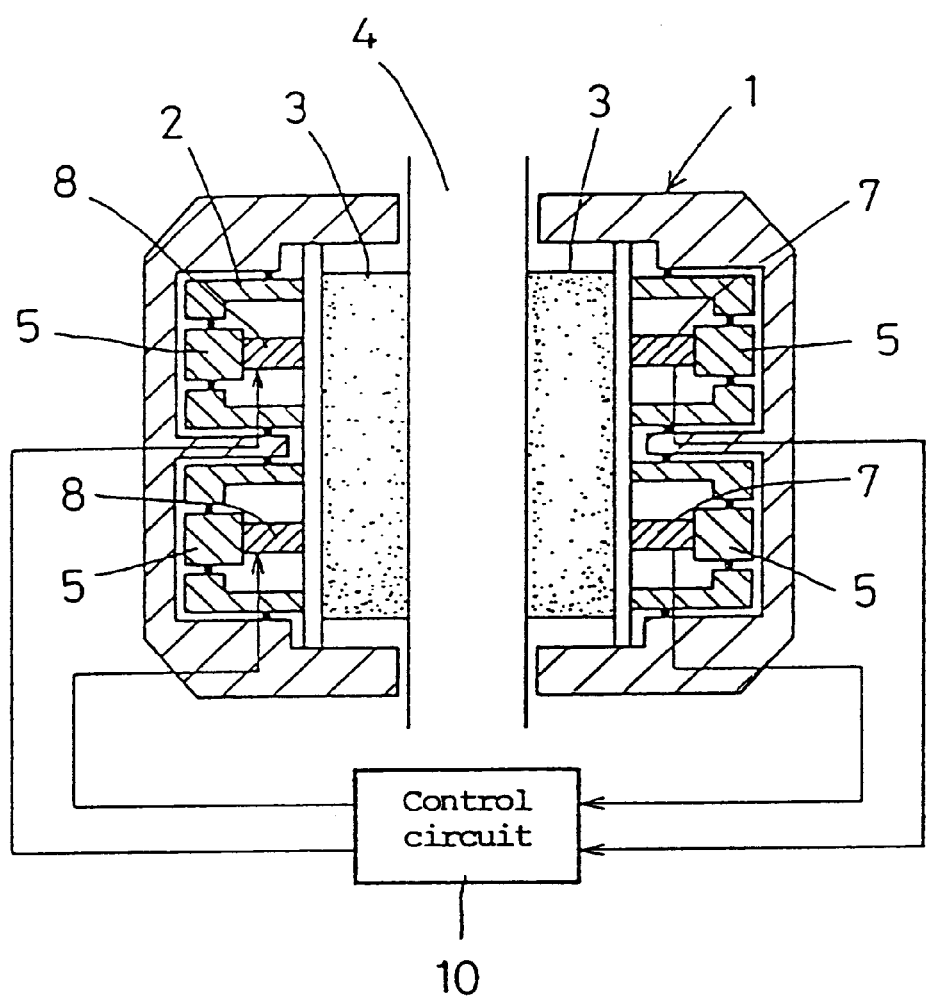
FIG. 1 is a partial sectional view of the disk brake provided with a vibration damper system embodying the invention.

An embodiment of this invention is now described with reference to the drawings. FIG. 1 is a partial section of a disk brake having a vibration damper embodying the invention. The disk brake shown has an opposed type caliper 1. As shown, brake pistons 2 are mounted in the caliper 1. A fixing piston 5 is received in each brake piston 2. Vibration detectors 7 and vibrators 8 are bonded or otherwise fixed to the fixing pistons 5 and adapted to be pressed against pads 3 by the respective pistons 5. The pads 3 are brought into frictional contact with a disk rotor 4.

Each fixing piston 5 is inserted in the respective brake piston 2 so as to be slidable in the axial direction of the disk with its outer periphery sealed by a piston seal. Brake fluid pressure in a fluid chamber of the caliper 1 is applied to the rear end faces of the brake pistons 2 and the pistons 5 to advance the pistons 5, thus pressing the vibration detectors 7 and the vibrators 8 against the pads 3. With this arrangement, machining accuracy of brake parts has no influence on the pressures at which the detectors 7 and vibrators 8 are pressed on the pads. For example, even if the thicknesses of the detectors 7 and vibrators 8 are not so precise, accurate detection and application of vibration are possible.

Figure 2:
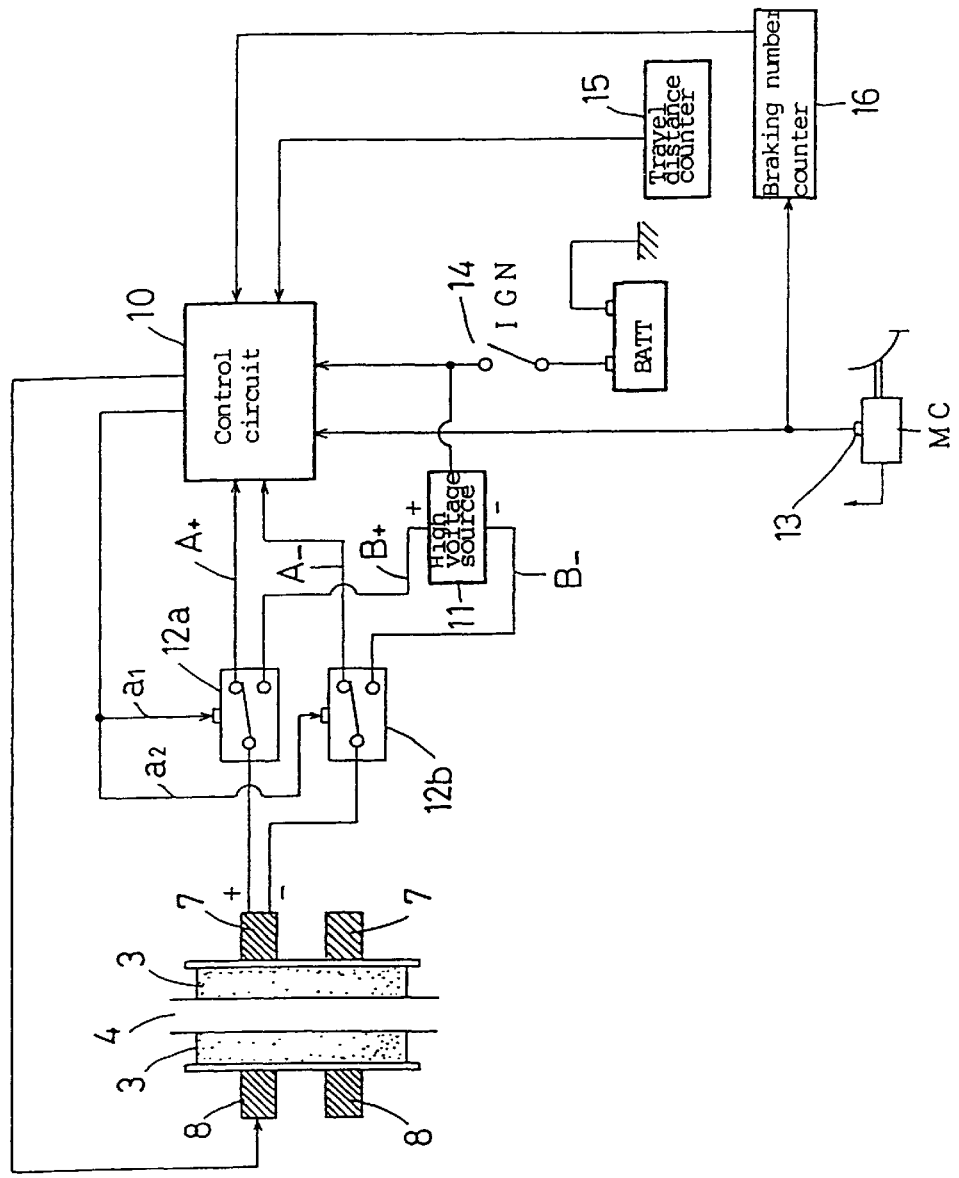
FIG. 2 is a block diagram of the entire damper system of FIG. 1.

FIG. 2 is a block diagram of the entire vibration damper system for the disk brake shown in FIG. 1. The vibration damper shown has a control circuit 10 which, based on vibrations detected by the vibration detectors 7, transmits a signal to the vibrators 8 to damp vibrations and suppress brake squeals.

The control circuit 10 also has the function of restoring the piezoelectricity of one or some of the vibration detectors 7 and vibrators 8 by applying a high DC field to their piezoelectric elements if the circuit 10 receives a timing signal which is produced in a piezoelectricity restoring phase.

In order to restore piezoelectricity, the vibration damper of this invention has a high voltage source 11 for generating a high voltage using the car battery for actuating the control circuit 10. As shown in FIG. 2, switches 12a, 12b are connected to detection signal lines A+, A− of each vibration detector 7 so as to be changed over in response to signals through signal lines a1, a2 from the control circuit 10 so that high voltage can be applied through lines B+, B− from the high voltage source 11. The high voltage source 11 shown is a DC—DC converter which steps up 12 V produced by the battery to 60 V.

The control circuit 10 activates the piezoelectricity restoration operation while the vehicle brakes are being applied with the vehicle either in motion or at a stop. The fact that the brakes are being applied is detected by a brake actuation detector 13 for detecting the pressure in the master brake cylinder MC. The control circuit 10 receives the signal from the detector and activates the piezoelectricity restoring phase at one of the following five timings:

1) when the ignition switch is turned on,
2) at the beginning of braking,
3) when the brakes are released,
4) when it becomes impossible to stop brake squeals, or
5) every time the vehicle travel distance or the number of times the brakes are applied reaches a predetermined value.

In order for the circuit 10 to determine the timing of starting the piezoelectricity restoration phase, a signal is transmitted to the circuit 10 from the ignition (IGN) switch 14, a travel distance counter 15 or a counter 16 for counting the number of times the brakes are applied.

More specifically, if the piezoelectricity restoration phase is to be started for the case 1), that is, when the ignition switch is turned on, a piezoelectricity restoration function trigger signal (5 V signal) is applied for a predetermined time period to the switches 12a, 12b from a one-shot multivibrator provided in the control circuit 10.

For the cases 2) or 3), a trigger signal is produced based on the signal of the brake pressure detector 13 to apply high voltage to the piezoelectric elements from the one-shot multivibrator for a predetermined time.

For the case 4), when it becomes increasingly difficult for the vibration damper to suppress brake squeals and if the vibration level detected by the vibration detectors eventually exceeds a threshold, a trigger signal is produced by e.g. a comparator to apply high voltage to the piezoelectric element from the one-shot multivibrator for a predetermined time period.

For the case 5), if the number of times the brakes are applied as measured by the counter 16, or if the vehicle travel distance as measured by the counter 15 exceeds a threshold, a trigger signal is produced by e.g. a comparator to apply high voltage to the piezoelectric element from the one-shot multivibrator for a predetermined time period.

In the figure, only one of the piezoelectric elements 7 is shown to be connected to the circuit 10 through the switches 12a, 12b. But actually, of course, the other three piezoelectric elements are also connected to the circuit 10 through similar switches.

Now description is made of how the squeal suppression and piezoelectricity restoration are performed in the vibration damper system of the invention.

The piezoelectric elements as the vibration detectors 7 detect vibration of the disk rotor 4 through one of the pads (e.g. inner pad). Based on the signal from the vibration detectors, the control circuit 10 adjusts the phase and amplitude of vibration and applies vibration that is opposite in phase to the vibration of the disk rotor 4 to the other pad (e.g. outer pad) and thus to the disk rotor 4 through the piezoelectric vibrators 8 to suppress vibrations of the disk rotor and thus brake squeals.

As the pads are pressed repeatedly against the disk rotor to apply brake, the temperature in the caliper 1 tends to rise due to friction heat. This deteriorates the piezoelectric characteristics of the piezoelectric elements.

Although the case is described below in which a single piezoelectric element is subjected to the piezoelectricity restoration, more than one piezoelectric elements that have deteriorated in piezoelectricity, or all four of them may be subjected to the piezoelectricity restoration. In the illustrated example, the piezoelectricity restoration command signal applied to the switches 12a, 12b is normally 0 volt (low level), thus connecting + and − terminals of the piezoelectric elements to the control circuit 10 through the switches 12a, 12b.

However, when a voltage of 5 V (high level) as piezoelectricity restoration signal is applied to the switches 12a, 12b, the + and − terminals of the piezoelectric elements are now connected to the high voltage source 11. The piezoelectric elements are thus repolarized and their piezoelectricity is restored. In the embodiment, 60 V is applied for about one second to restore piezoelectricity. But the level and duration of the voltage applied are not limited but may vary with the characteristics of the piezoelectic elements.

If only piezoelectric element or elements that have deteriorated in piezoelectricity are to be subjected to piezoelectricity restoration, it is necessary to detect which one or ones of the piezoelectric elements have actually deteriorated in piezoelectricity. For this purpose, the control circuit 10 may be provided with a program for measuring the capacitance of each piezoelectric element, comparing it with a reference capacitance and specifying any deteriorated one.

The piezoelectricity restoration phase starts at a timing when one of the above-listed five conditions is met.

Figure 3:
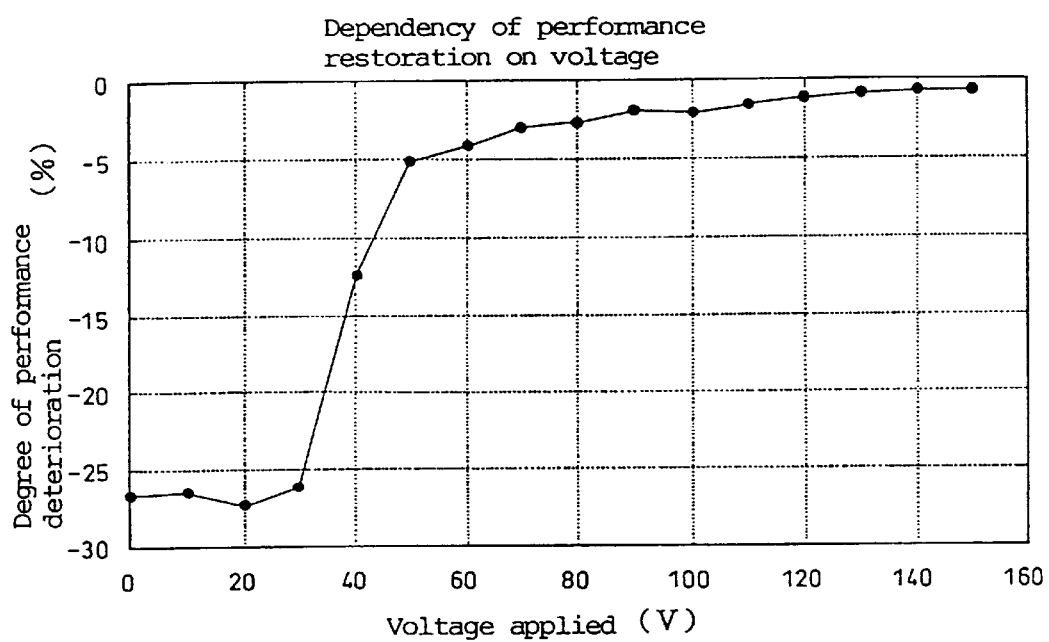
FIG. 3 is a graph showing voltage-dependent performance restoration properties.

FIG. 3 shows how a piezoelectric element that had deteriorated in piezoelectricity due to the temperature rise at the pad linings to 250° C. restored piezoelectricity by applying a high DC field. In this experiment, 60 V was applied for about one second to the piezoelectric vibration detector or vibrator. In the graph of FIG. 3, the vertical axis indicates the degree of performance deterioration compared with the initial squeal-suppressing performance. From this graph, it is apparent that the performance of the sample dropped by more than 25% from the initial performance and then restored almost completely. It is possible to restore performance by applying voltage only for a short time. Thus, the energy needed for performance restoration is small.

The degree of performance deterioration in the graph is given by:

Degree of performance deterioration (%)=((capacitance of piezoelectric element at evaluation−initial capacitance of piezoelectric element)/initial capacitance of piezoelectric element)×100

The piezoelectric element used in this measurement could withstand a voltage of 150 V. The vertical axis indicates the degree of performance deterioration in terms of capacitance compared with the initial value. From the graph, it is apparent that the application of a voltage of 60 V or more is enough to restore the performance.

Besides the measurement of the degree of performance deterioration in terms of capacitance, the degree of performance deterioration was measured in terms of the disk rotor vibration damping rate as follows:

Degree of performance deterioration (%)=((performance at evaluation−initial performance)/initial performance)×100

For the deterioration effect, the vibration damping rate changed from the initial damping rate of 0.31 times to 0.62 times when deteriorated. It returned to 0.32 times after the performance restoration treatment. Thus, the deterioration effect was about 100%.

As has been described in detail, even if the piezoelectric elements are heated to high temperatures due to repeated braking operations and lose their piezoelectricity, they can restore piezoelectric properties by applying high DC voltage. Thus, the reliability and durability of the piezoelectric elements can be improved.

What is claimed is:

1. A vibration damper system for a vehicle brake including a vibration detector comprising piezoelectric elements for detecting vibration produced when a rotary member of the wheel brake is braked by a friction member, a control circuit, and a vibrator comprising piezoelectric elements, said vibration detector transmitting a vibration damping a signal based on the detected vibration to said vibrator through said control circuit to suppress vibration, said vibration damper system further comprising a higher voltage source and a plurality of changeover devices provided along a signal line connecting each of said piezoelectric elements of said vibration detector and said vibrator to said control circuit, said control circuit transmitting a changeover signal to at least one of said changeover devices in response to a timing signal inputted into said control circuit to selectively apply high voltage to at least one of said piezoelectric elements from said high voltage source.

2. A vibration damper system as claimed in claim 1 wherein said control circuit is adapted to transmit a changeover signal to all of said changeover devices in response to a timing signal to apply high voltage to all of said piezoelectric elements from said high voltage source.

3. A vibration damper system as claimed in claim 1 wherein said control circuit is adapted to transmit, in response to a timing signal, a changeover signal to said changeover devices corresponding to one of said piezoelectric elements which has deteriorated in performance to apply high voltage to said one of said piezoelectric elements from said high voltage source.

4. A vibration damper system as claimed in claim 1 wherein said high voltage source produces high voltage by stepping up a voltage produced by a car battery.

* * * * *